United States Patent
Schantz et al.

(10) Patent No.: US 6,431,670 B1
(45) Date of Patent: Aug. 13, 2002

(54) INK LEVEL SENSING METHOD AND APPARATUS

(75) Inventors: Christopher A Schantz, Redwood City, CA (US); Wen-Li Su, Vancouver, WA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/502,360

(22) Filed: Feb. 14, 2000

(51) Int. Cl.[7] ............................... B41J 2/195
(52) U.S. Cl. ............................ 347/7; 347/19
(58) Field of Search ................. 347/7; 73/304 R, 73/290 R, 304 C

(56) References Cited

U.S. PATENT DOCUMENTS

| | | | |
|---|---|---|---|
| 5,465,619 A | * 11/1995 | Sotack et al. | 73/304 C |
| 5,623,291 A | * 4/1997 | Morandotti et al. | 347/7 |
| 5,682,184 A | 10/1997 | Stephany | 347/7 |
| 5,719,556 A | 2/1998 | Albin | 340/618 |
| 5,757,390 A | * 5/1998 | Gragg et al. | 347/7 |
| 6,010,210 A | * 1/2000 | Wilson et al. | 347/85 |
| 6,183,054 B1 | * 2/2001 | Froger et al. | 347/7 |
| 6,185,515 B1 | * 2/2001 | Froger et al. | 702/199 |

FOREIGN PATENT DOCUMENTS

| | | |
|---|---|---|
| EP | 10119301 | 12/1998 |
| FR | 2 769 708 A | 4/1999 |

OTHER PUBLICATIONS

European Search Report, Application No.: EP 01 30 0733, dated May 25, 2001.

* cited by examiner

Primary Examiner—Craig A. Hallacher

(57) ABSTRACT

An ink cartridge of a printer includes first and second electrodes on opposite sides of an ink reservoir. Level of ink in the reservoir may be measured by applying a sense signal to the first electrode, detecting a signal at the second electrode, extracting DC content of the detected signal, and using the DC content to determine the ink level.

15 Claims, 7 Drawing Sheets

INK LEVEL SENSING METHOD AND APPARATUS

BACKGROUND OF THE INVENTION

The present invention relates generally to ink jet printers. More particularly, the present invention relates to ink level sensing for printers utilizing ink jet cartridges and ink reservoirs.

An operational consideration for printers utilizing ink reservoirs and cartridges is the level of ink in the cartridges. Sensing the ink level is performed so that the printer does not attempt to print without ink. Operation of ink jet and other types of printers without ink can damage the printer's print head.

In thermal ink jet printers, printing is performed by boiling ink and shooting the ink through very small nozzles hundreds or even thousands of times per second. Printing without the ink, the print head—a complex electromechanical system containing hundreds of nozzles, heating elements, barriers, ink flow channels, and underlying circuits—would be irreparably damaged.

In the past, printing without ink was not a pressing concern because useful life of the print heads was short. By the time the ink was depleted, the print head usually needed to be replaced. After depletion of the ink, the entire cartridge, including the print head, was discarded. Thus, the old ink jet cartridges were built as disposable units.

More recently, however, the print heads are being built as reusable units. The print heads are able to last beyond the depletion of the ink. Because the print head is relatively expensive as compared to the ink, it is becoming increasingly common to replenish the ink rather than to discard the print head. For this reason, printing without ink should be avoided so as to avoid damaging the print head.

Additionally, operation of a printer with a depleted ink supply may lead to loss of important information. For example, a printer printing a facsimile message may receive the transmitted information and operate as if the received information is being printed. If the ink is depleted, the information is never printed. Unless the receiver can ask the sender to retransmit the fax, the information is irretrievable.

Knowing the exact ink level of the ink cartridge may be important under other considerations. For instance, before beginning a large print job, it would be useful to know whether the remaining ink is sufficient to finish the print job. If the amount of ink is insufficient, the ink cartridge can be replaced or replenished to avoid wasting time, paper, and effort of unsuccessfully attempting to print the large print job.

The ink level of foam-filled ink containers may be sensed by measuring the opacity of an open area within the foam. The measurement is made with a light source and a photodetector. The ink level is sensed at only one location within the reservoir. Therefore, ink level above or below the sensing point cannot be determined. Additionally, this optical technique depends upon the ink level changing within the foam in a known manner, and gives erroneous readings in some circumstances. For example, a partially full cartridge stored for some time on its side may provide erroneous readings.

There is a need to detect the level of ink remaining in the ink reservoir.

SUMMARY OF THE INVENTION

According to one aspect of the invention, an ink cartridge for a printer includes a housing defining an ink reservoir; a first electrode proximal to the reservoir; and a second electrode proximal to the reservoir. The electrodes are spaced apart for ink level measurement of the reservoir.

Other aspects and advantages of the present invention will become apparent from the following detailed description, taken in conjunction with the accompanying drawings, illustrating by way of example the principles of the present invention.

DETAILED DESCRIPTION OF THE INVENTION

Figure 4:
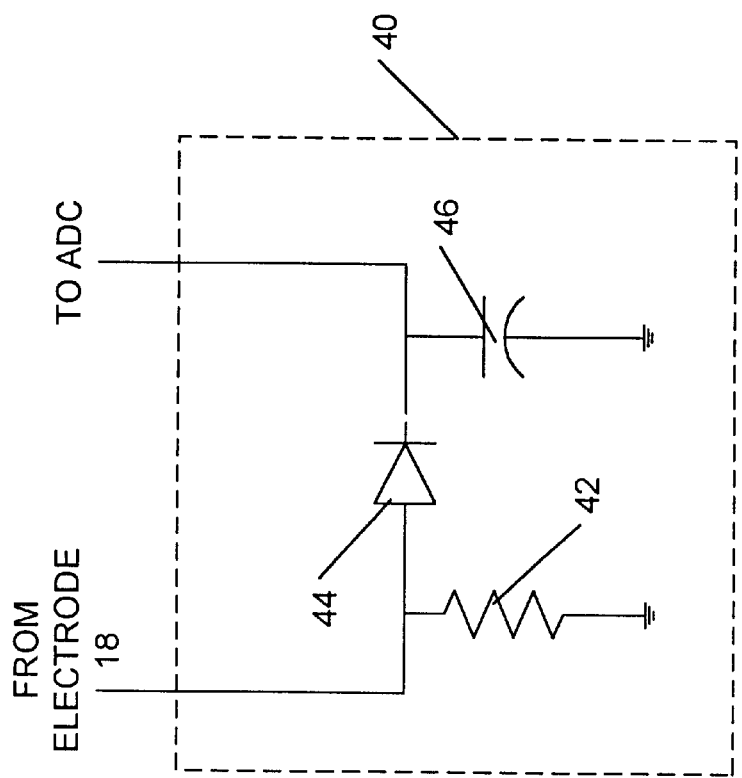
FIG. 4 is an illustration of a filter circuit in accordance with a preferred embodiment of the present invention.

As shown in the drawings for purposes of illustration, the present invention is embodied in a method of and apparatus for detecting the level of ink remaining in an ink jet cartridge. If the ink level is found to be very low, operation of the printer can be halted to prevent damage to the print head. The ink level measurement can also be used to determine the remaining lifetime of the ink, thus allowing for prudent scheduling of print jobs. Additionally, measuring the ink level of the cartridge can prevent loss of valuable information.

Figure 1:
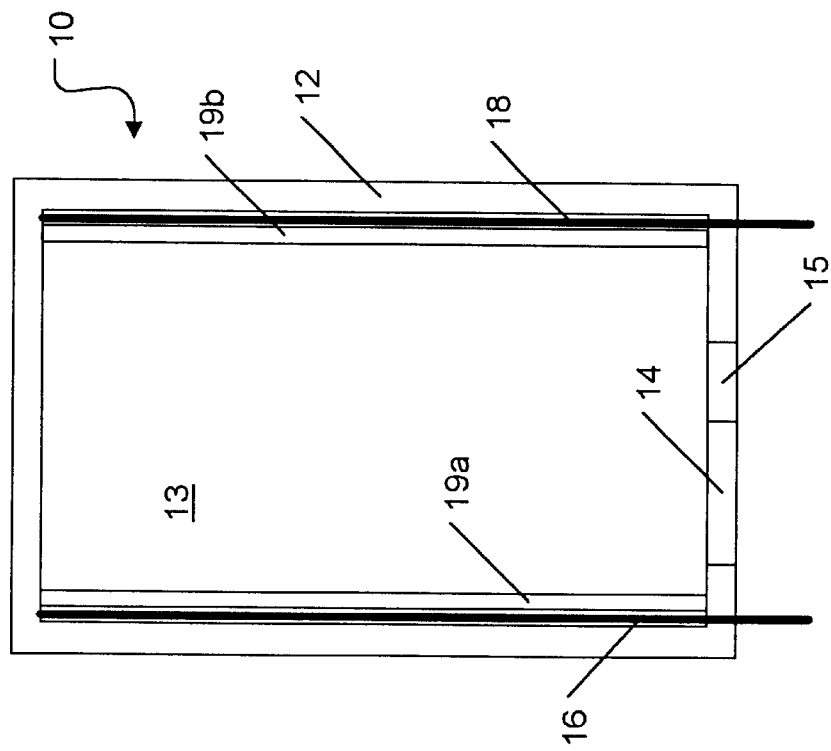
FIG. 1 is a sectional view of an ink cartridge in accordance with a preferred embodiment of the present invention.

Referring to FIG. 1, an ink jet cartridge 10 includes a housing 12 and a print head 14. The housing 12 defines a reservoir 13 for ink. The ink may be liquid, solid, or foam-filled. A first electrode 16 is located against a first side of the housing 12 and a second electrode 18 is located against a second side of the housing 12. The second side may be the opposite the first side. The electrodes 16 and 18 are made of electrically conductive material that can be patterned. The electrodes 16 and 18 need not be very thick. In fact, the electrodes 16 and 18 may be thin as practical, and may be applied on the housing 12 as conductive paint. In experiments, electrodes of 0.5 mils think have been used successfully. Further, the electrodes 16 and 18 may extend from the top of the reservoir 13 to the bottom of the reservoir 13. In this configuration, the reservoir's ink level may be measured from full to empty. Otherwise, there is little, if any, restrictions on the size or the shape of the electrodes 16 and 18.

Dielectric material 19a and 19b may be used to cover the electrodes 16 and 18, respectively. The coverings 19a and 19b protect the electrodes 16 and 18 from the ink in the reservoir 13 and prevent electrolysis or other chemical reactions between the ink and the electrodes 16 and 18. The dielectric material 19a and 19b may be KAPOK® tape of sufficient thickness. The dielectric material 19a and 19b may be less than 30 mils thick. The dielectric material 19a and 19b should be thin as practical yet thick enough to prevent electro chemical reactions between the electrodes and ink. For example, the dielectric coverings 19a and 19b may be three (3) mils thick. The cartridge 10 may include memory 15 for holding lookup tables and other information. The memory 15 and lookup tables are discussed further below.

A sense signal is applied to the first electrode 16, and a signal is detected at the second electrode 18. The detected signal is different than the sense signal applied to the first electrode 16 due to various factors. For example, the sense signal travels the distance between the first electrode 16 and the second electrode 18. Depending upon the electrical properties of the dielectric 19a and 19b, the dielectric 19a and 19b and the electrodes 16 and 18 may exhibit capacitor-like properties. Furthermore, the sense signal is altered due to the amount and the electrical properties of the ink of the reservoir 13. The ink of the reservoir may be characterized as presenting Resistance-Capacitance ("RC") circuits to the sense signal.

Figure 2:
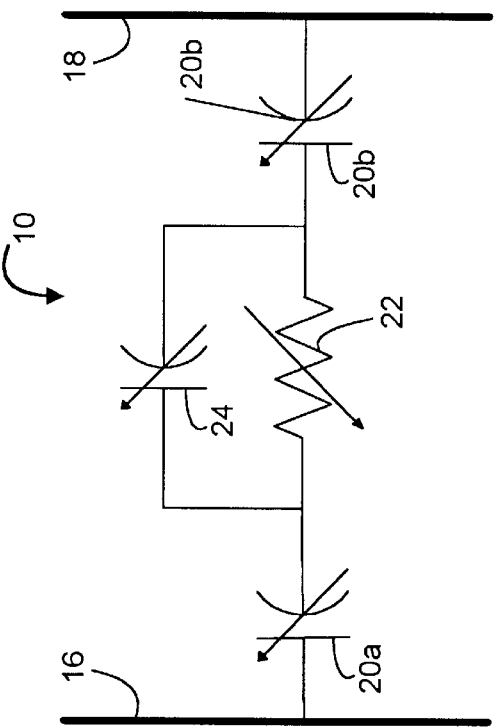
FIG. 2 is an illustration of a representative circuit for demonstrating electrical characteristics of a fluid reservoir.

FIG. 2 illustrates electrical characteristics of the ink reservoir 13 of the ink cartridge 10. The ink jet cartridge 10 can be analogized as a RC circuit. A capacitance formed between the first electrode 16 and its covering dielectric 19a is represented by a first capacitor 20a. Another capacitance formed between the second electrode 18 and its covering dielectric 19b is represented by a second capacitor 20b. The ink provides resistance, as represented by a resistor 22. The ink in the reservoir 13 also provides capacitance that is represented by a capacitor 24.

The resistor 22 and the capacitors 20a, 20b, and 24 are not actually present in the ink reservoir 13 and are provided merely to illustrate the electrical properties within the ink reservoir 13. The resistor 22 and the capacitors 20a, 20b, and 24 are illustrated as variable components because, as the ink level drops, the representative values of these components vary. For example, as the ink level drops, the representative value of the resistor 22 increases.

The resistance of the ink reduces the current flow between the electrodes 16 and 18 and causes a voltage drop between the electrodes 16 and 18. The capacitance—represented by the capacitors 20a, 20b, and 24—causes a phase shift between the voltage and the current between the electrodes 16 and 18. The degree of the phase shift depends upon the relative value of the total capacitance to the value of the resistance.

The resistances and capacitance of the ink jet cartridge 10 depend upon various factors. These factors include, but are not limited to, the following: the topology of the reservoir; the inherent electrical characteristic of the ink contained therein; the size and the shape of the electrodes 16 and 18; the material from which the electrodes 16 and 18 are made; the electrical characteristics of the dielectric used; and the amount of ink remaining in the cartridge 10.

When the ink is depleted, the reservoir 13 acts as an open circuit with the resistor 22 having theoretically an infinite value and the capacitors 20a, 20b, and 24 having no effect. On the other hand, when the ink is full, the reservoir 13 has the lowest resistance and the highest capacitance. The exact, numerical value for the "lowest resistance value" of the resistor 22 and the exact, numerical value for the "highest capacitance value" of the capacitors 20a, 20b, and 24 depend upon various factors some of which are listed above, and can be obtained by experimental or other methods.

Figure 3:
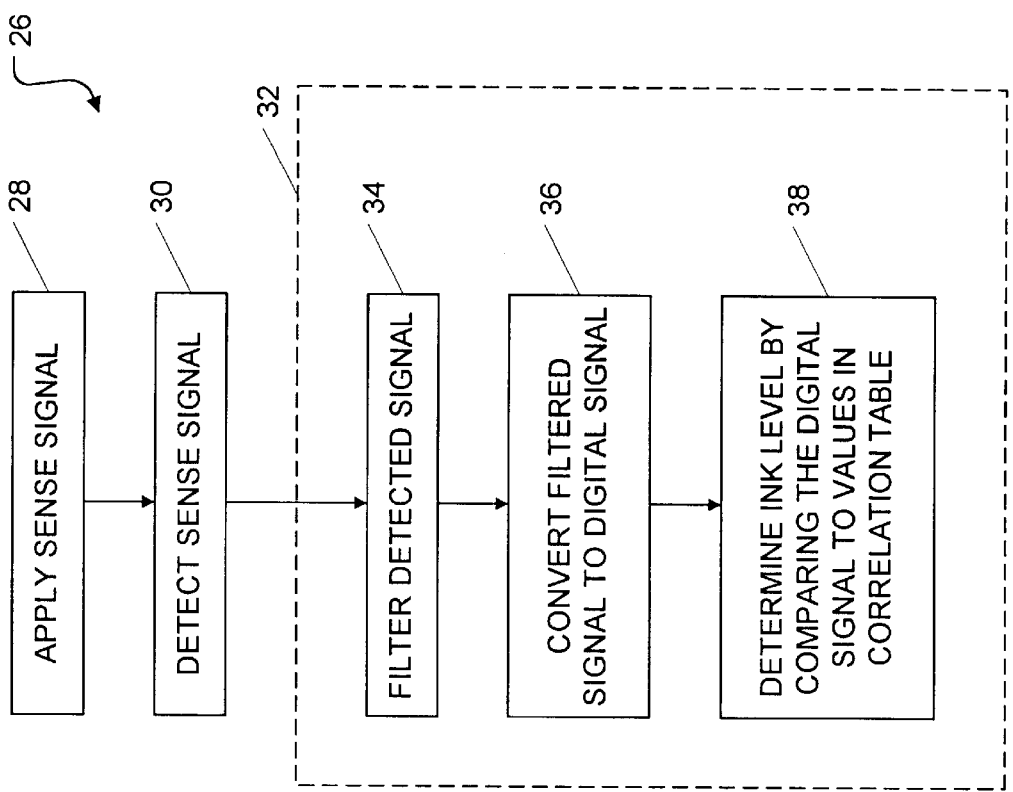
FIG. 3 is a flowchart of a method of measuring ink level in accordance with the present invention.

FIG. 3 is a flowchart 26 illustrating the steps for measuring the ink level of the reservoir 13. When a measurement of the ink level is desired, the sense signal is applied to the first electrode 16. This step is represented by block 28.

The sense signal may be applied by an oscillator connected to the first electrode 16. In the preferred embodiment, the oscillator may include a clock circuit commonly found in most printers and other electronic devices. Such clock circuits typically produce a square-wave DC signal at a predetermined frequency. Thus, a square-wave DC signal may be used as the sense signal. Alternatively, an AC signal may be used as the sense signal. The sense signal is detected at the second electrode 18 (block 30) and the detected signal is converted to an ink level measurement (block 32). During conversion, the detected signal is filtered by a filter circuit into a filtered signal (block 34). The filtered signal is then converted to a digital signal (block 36). This is typically performed using an analog-to-digital converter (ADC). Finally, the value of the digital signal is used to determine the ink level (block 38).

The conversion of the digital signal value to the fluid level measurement may be performed at least two different ways. The digital signal value may be converted to the fluid level by using a correlation table. The correlation table would list signal values within the range of expected digital signal values, and it would relate each of the listed signal values to a fluid level.

Alternatively, the fluid level may be determined by calculating a fluid level using coefficient values from a coefficient table. In this implementation, the digital signal value is correlated to a set of coefficients using a coefficient table. The coefficient table would list signal values within the range of expected digital signal values, and it would relate each of the listed signal values to a set of coefficients to be used for the calculation of the fluid level. The correlation table and the coefficient table are referred to generically as a "lookup table." The coefficients would probably be different for each design of the reservoir. The equation depends upon, at minimum, the geometry and size of the reservoir and the electrodes, and also depends upon the type of fluid used.

The ink level measurement may be performed continuously or periodically. The period of time between the measurements may vary from less than a second to several minutes or even hours. Many factors are considered to determine the period of time between the measurements including, without limitation, size of the cartridge, rate of the usage, activities of the printer, etc. Also, the period of time between the measurements may vary in accordance with the ink level. For example, the ink level may be measured more often when the ink level falls below a predetermined threshold such as ten percent of capacity.

FIG. 4 illustrates a filter circuit 40 for filtering the detected signal. The filter circuit 40 is a simple low pass filter that may be implemented in many different configurations. A preferred embodiment of the filter circuit 40 includes a current sense resistor 42 connected between the second electrode 18 and ground. A diode 44 is connected between the current sense resistor 42 and a voltage sense capacitor 46. The voltage sense capacitor 46 is connected between the diode 44 and ground. The current component of the detected signal appears as a sense voltage across the current sense resistor 42. This sense voltage is rectified by the diode 44, and the peak value appears across the voltage sense capacitor 46. Thus, the resistor 42, the diode 44, and the capacitor 46 work together to attenuate AC components of the detected signal. The remaining DC voltage component of the detected signal is the filtered signal.

Figure 5:
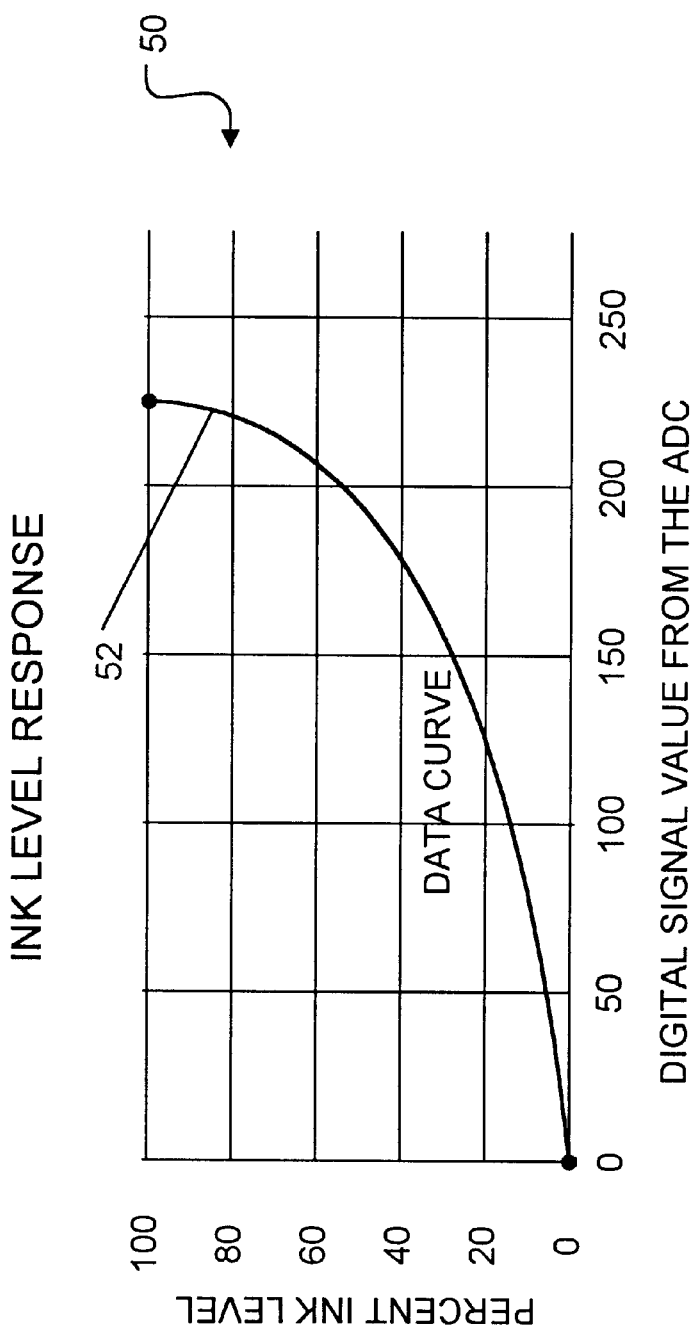
FIG. 5 is a plot of percent ink level verses digital signal value of a sample ink cartridge.

The filtered signal may not be linearly related to the ink level as indicated by the data curve 52 of FIG. 5. FIG. 5 illustrates percent ink level verses digital signal value of an experimental ink cartridge. An X-axis of the diagram 50 indicates digital signal values. An Y-axis of the diagram 50 indicates percent ink level within the experimental ink cartridge's reservoir. An 8-bit analog-to-digital converter ("ADC") can produce digital signal values ranging from 0 to 255. The data curve 52 shows that when the ink cartridge 10 is full, a digital signal value of about 220 is produced from the detected signal. The data curve 52 also shows that the digital signal value is zero when the ink cartridge 10 is empty.

FIG. 5 shows that, for a given change in percent ink level, change in digital signal values at low ink levels is larger compared to change in the digital signal values at high ink levels. This increased sensitivity at low ink levels provides for increased accuracy at low ink levels. This is desirable because accuracy at low ink levels is more useful in the process of determining whether or not to refill or replace the reservoir.

Figure 6:
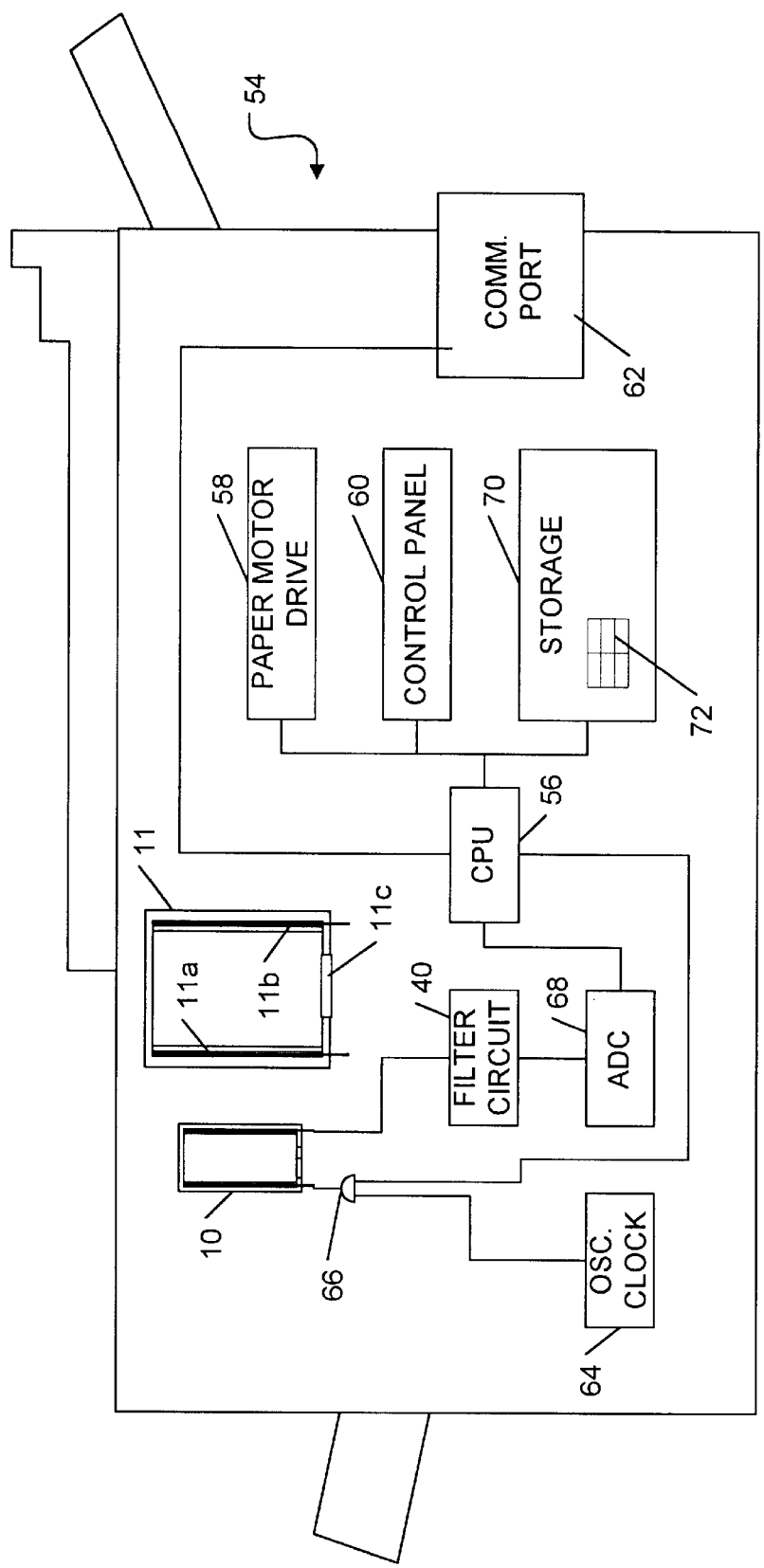
FIG. 6 is an illustration of a printer including the ink cartridge.

FIG. 6 illustrates a printer 54 including the ink cartridge 10 in accordance with the present invention. The printer 54 has a processor 56 connected to various printer subsystems such as a paper motor drive 58 and printer control panel 60. The printer 54 is typically connected to a host computer (not shown) through a communication port 62. The host computer sends, via the communications port 62, jobs for printing. The printer 54 sends, via the communications port 62, various status messages including ink levels of cartridges within the printer.

The printer 54 includes a clock 64 for providing the sense signal to the cartridge 10. The sense signal from the clock 64 may be controlled by a switch 66. A logical AND gate may be used as the switch 66. The other input to the switch (AND gate) 66 may be a control signal from the processor 56. Using the switch 66, the processor 56 controls when the sense signal is applied to the cartridge 10. The sense signal is applied to the first electrode 16 when ink level measurements are being performed.

The printer 54 includes the filter circuit 40, which is connected to the second electrode 18 of the cartridge 10. An ADC 68 receives the filtered signal and converts it to a digital signal. The processor 56 reads the digital value and converts it to ink level measurement.

As discussed above, the conversion of the digital signal value to the ink level measurement may be performed by using a lookup table 32. The lookup table 72 may be stored within a storage 70 that is accessible by the processor 56. The values for the lookup table 72 may be predetermined via experimental or other methods. The storage 70 may be ROM, RAM, magnetic disk, or any suitable machine-readable media including a combination of two or more types of such media. The lookup table 72 may be a correlation table or a coefficient table. For a correlation table, the first column may list signal values and the second column may list corresponding fluid level. For a coefficient table, the first column may list signal values and the second column may list corresponding coefficient values to be used in calculating the fluid level.

Alternatively, the lookup table 72 may be placed within memory 15 attached to the cartridge 10. Such memory 15 is usually programmable and can be read by the printer once the cartridge 10 is installed. Memory chips can be programmed with information relating the predicted ink level response of the printer's circuitry for that specific cartridge. For instance, the memory chips can include the lookup table, which would allow a processor to determine ink level from the digital signal values. In this way, the particular design of the cartridge 10 may be changed to suit engineering or market needs and the printer will be able to continue to accurately detect ink levels of varying ink cartridges.

The printer 54 may include a remote ink supply 11, which is remote to the cartridge 10. The remote ink supply 11 may contain a larger supply of ink than the cartridge 10. When the ink within the cartridge 10 falls below a predetermined level, the remote ink supply 11 may be used to refill the cartridge 10 (a refill mechanism is not shown in FIG. 6). The remote ink supply 11 may also include a first electrode 11a for receiving the sense signal and a second electrode 11b for receiving the detected signal. Although connections to the electrodes 11a and 11b of the remote ink supply 11 are not shown in FIG. 6, the electrodes 11a and 11b may be connected in the same manner as the electrodes 16 and 18 of the cartridge 10. The remote ink supply 11 may also include memory 11c for holding lookup tables and other information.

The printer 54 may send the ink level measurement to a computer connected to the printer 54 via the communications port 62. The ink level measurement may be sent when, for instance, the ink level is below a predetermined threshold. Alternatively, the host computer may request the ink level measurement each time a print job is sent to the printer 54 from the host computer. The host computer may monitor the ink level during a print job to ensure a successful completion of the print job.

Ink level information may be made available via the control panel 60. A user may demand an ink level measurement using the control panel 60. In response, a precise ink level measurement is displayed by the control panel 60. When the ink level is below a predetermined threshold, the control panel 60 may be used to display a warning message. The warning message may appear whether or not link level status was requested.

Figure 7:
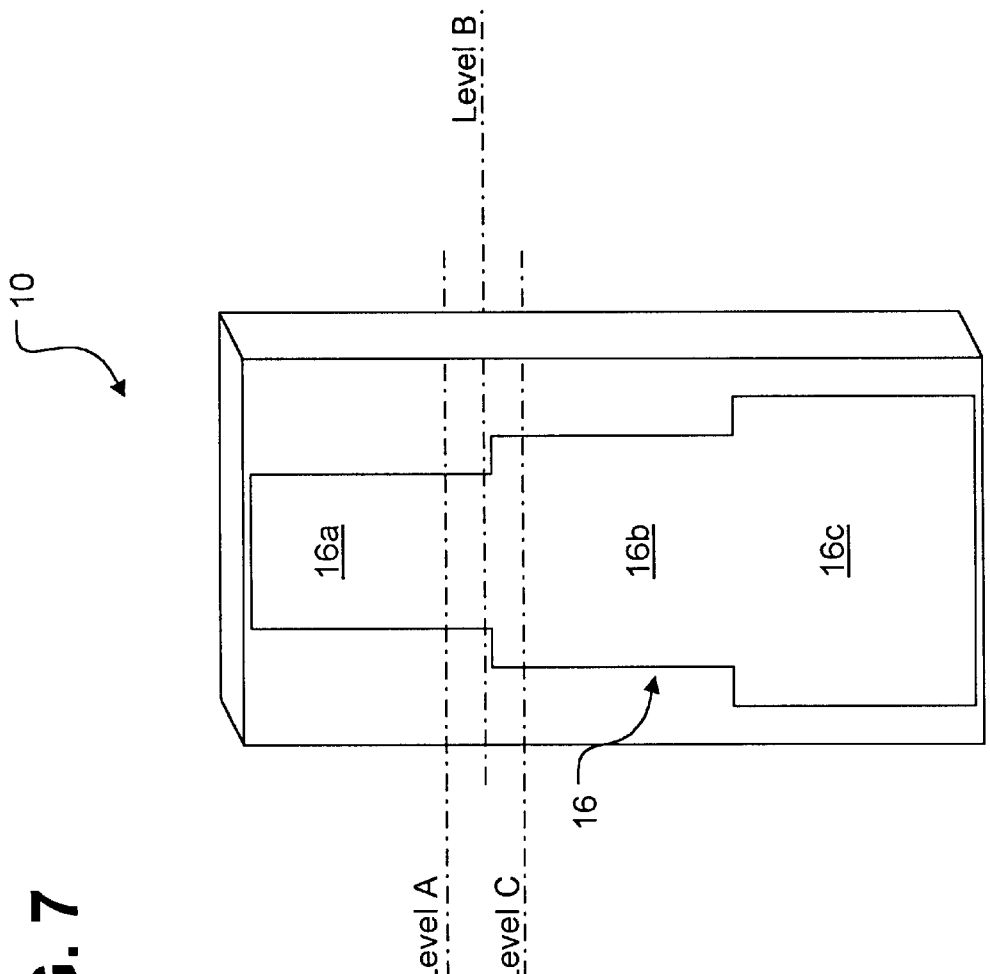
FIG. 7 is a sectional view of an alternative embodiment of an ink cartridge in accordance with the present invention.

FIG. 7 shows the first electrode 16 on a first side of the cartridge 10 and the second electrode (not shown) on an opposite (second) side of the cartridge 10. The second electrode may have the same configuration as the first electrode. The first electrode 16 is not uniform in width, but has portions of differing widths. The first electrode 16 has top, middle and bottom portions 16a, 16b and 16c. The top portion 16a is narrowest, and the bottom portion 16b is widest. The portions having different widths define different areas. This design has several advantages. When the ink is low, the ink level detection system is most sensitive and accurate (because the bottom portion 16c is widest, or have larger relative area).

Moreover, abrupt changes in the measurement can be used to determine exact level of the fluid in the reservoir 13. When the ink level falls from Level A to Level B, there would be a relatively proportional change in the detected signal. However, when the ink level falls from Level B to Level C, the change in the detected signal is abrupt. Such abrupt changes can be recognized by the processor 56 to detect the exact level of the ink in the reservoir since the precise location of the change in the width of the electrodes is known.

Although specific embodiments have been described and illustrated, the invention is not limited to the specific forms of arrangements of parts so described and illustrated.

For example, use of the dielectric coverings 19a and 19b is preferred but not required. Electrolysis between the electrodes 16 and 18 and the ink can be minimized, without the dielectric tape 19a and 19b, by selecting a sufficiently high frequency signal as sensing signal utilized for the present invention.

The sense signal may be an AC signal or a DC square wave signal. The specific frequency may be chosen with relatively broad latitude; however, choosing a frequency where both the resistive and capacitive properties contribute can maximize sensitivity of the detection system. That is where the current-voltage phase angle difference is around 45 degrees.

Figure 8A:
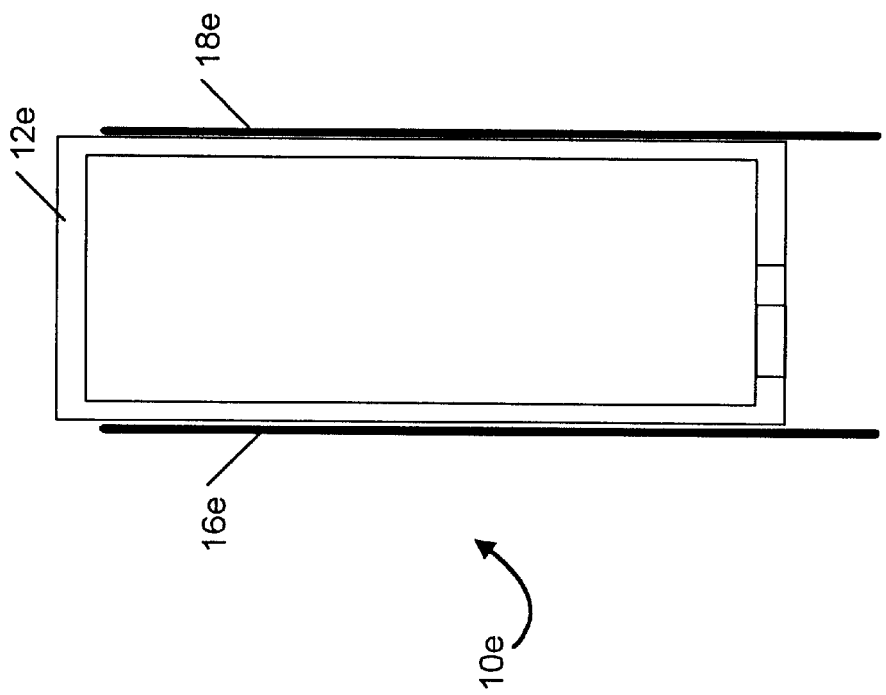
FIG. 8A is a sectional view of another embodiment of an ink cartridge in accordance with the present invention.
Figure 8B:
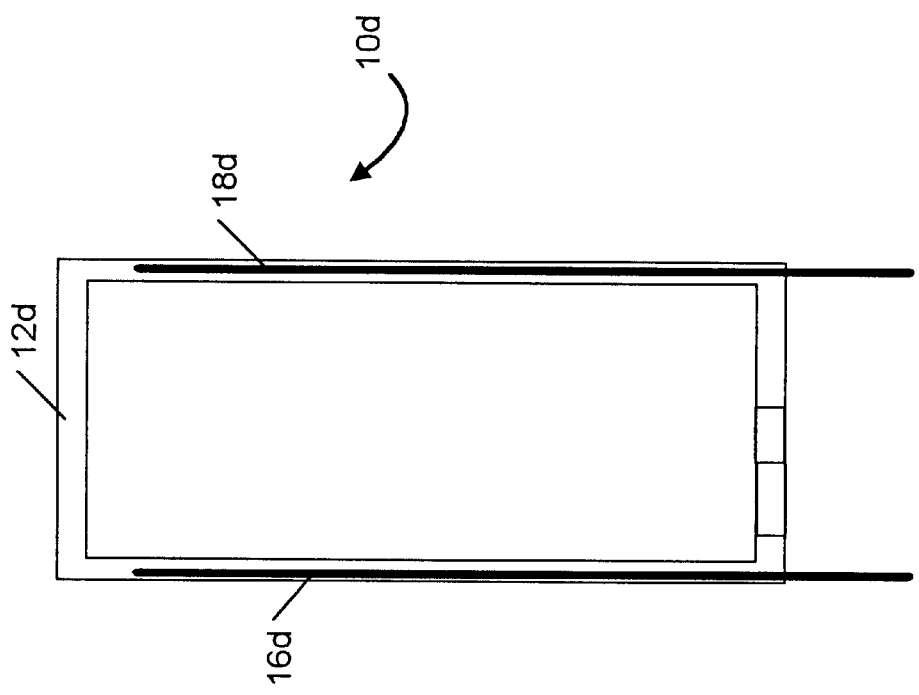
FIG. 8B is a sectional view of yet another embodiment of an ink cartridge in accordance with the present invention.

FIG. 8A shows a cartridge 10d in which electrodes 16d and 18d are built into, or embedded within, walls of a reservoir housing 12d. FIG. 8B shows a cartridge 10e in which the electrodes 16e and 18e are placed outside reservoir housing 12e.

Figure 9:
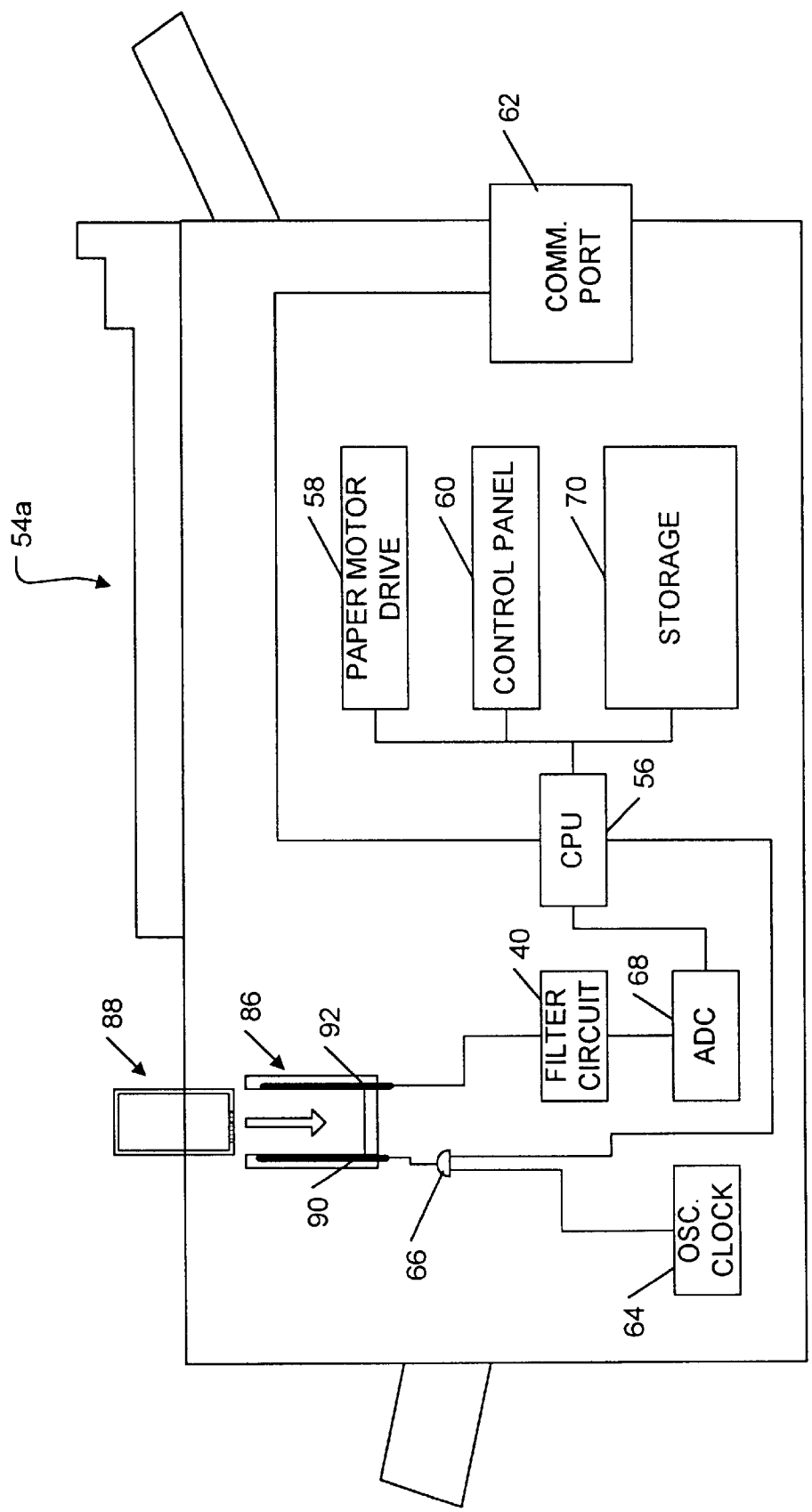
FIG. 9 is an illustration of a printer having a fluid reservoir receptacle in accordance with the present invention.

FIG. 9 illustrates an appliance 54a having an ink cartridge receptacle 86 for an ink reservoir 88. The appliance 54a may also include many of the same the components 40, 56, 58, 60, 62, 64, 66, 68 and 70 as the printer 54 of FIG. 6. A first electrode 90 may be placed on a first side of interior of the receptacle 86, and a second electrode 92 may be placed on a second side of the interior of the receptacle 86. In an alternative implementation, the electrodes 90 and 92 may be embedded within the walls of the receptacle 86. Because the electrodes 90 and 92 are a part of the receptacle 86, they may be used to detect other fault conditions such as a condition where the reservoir is not installed.

The present invention may be implemented as an ink jet cartridge, ink reservoir, remote ink supply, and a printing system or appliance with improved reservoir receptacle. However, the present invention may be implemented in other contexts. For example, the present invention may be implemented as an apparatus measuring fluid level within a canister containing beverage, syrup, or other food or chemicals.

Accordingly, the present invention is not limited to the embodiments described above. Instead, the present invention is construed according to the claims that follow.

What is claimed is:

1. An ink cartridge for a printer, the cartridge comprising:
   a housing defining an ink reservoir:
   first and second electrodes proximal to the reservoir: and
   memory attached to the housing and encoded with data for converting a signal detected at the second electrode into a signal indicating a level of ink in the reservoir.

2. The ink cartridge of claim 1, wherein the memory is encoded with correlation data for converting the signal detected at the second electrode.

3. The ink cartridge of claim 1, wherein the memory is encoded with coefficients for converting the signal detected at the second electrode.

4. The ink cartridge of claim 1, wherein the memory is encoded with coefficients for converting the signal detected at the second electrode.

5. An ink cartridge for a printer, the cartridge comprising:
   a housing defining an ink reservoir;
   a first electrode proximal to the reservoir; and
   a second electrode proximal to the reservoir;
   the electrodes spaced apart for ink level measurement of the reservoir;
   at least one of the electrodes having at least two portions of different widths.

6. The ink cartridge of claim 5, wherein changes between the portions of different widths are abrupt.

7. The ink cartridge of claim 5, wherein each electrode has top, middle and bottom portions, the bottom portion wider than the middle portion, the middle portion wider than the top portion.

8. The ink cartridge of claim 5, further comprising memory attached to the housing and encoded with data for converting a signal detected at one of the electrodes into a signal indicating a level of ink in the reservoir.

9. The ink cartridge of claim 8, wherein the data is specific to the cartridge.

10. A printer comprising:
    a fluid reservoir;
    a first electrode placed proximal to a first side of the reservoir;
    a second electrode placed proximal to a second side of the reservoir, the second side being opposite the first side;
    a processor for converting a signal at the second electrode to ink level measurements; and
    storage encoded with a lookup table;
    wherein the processor uses the lookup table to convert signal values to ink level measurements; and
    wherein at least one of the electrodes has at least two portions of different widths.

11. The printer recited in claim 10, further comprising an oscillator for providing a sense signal to the first electrode, and a filtering circuit for removing ac content from a signal detected at the second electrode, the processor using the lookup table to correlate signal values of the signal filtered by the filtering circuit.

12. The printer of claim 10, wherein the lookup table includes correlation data.

13. The printer of claim 10, wherein the lookup table includes coefficients.

14. The ink cartridge of claim 10, wherein changes between the portions of different widths are abrupt.

15. The ink cartridge of claim 10, wherein each electrode has top, middle and bottom portions, the bottom portion wider than the middle portion, the middle portion wider than the top portion.

* * * * *